July 18, 1939.  E. A. ROBERTSON  2,166,420
IGNITION MANIFOLD CABLE
Original Filed Dec. 15, 1928  2 Sheets-Sheet 1
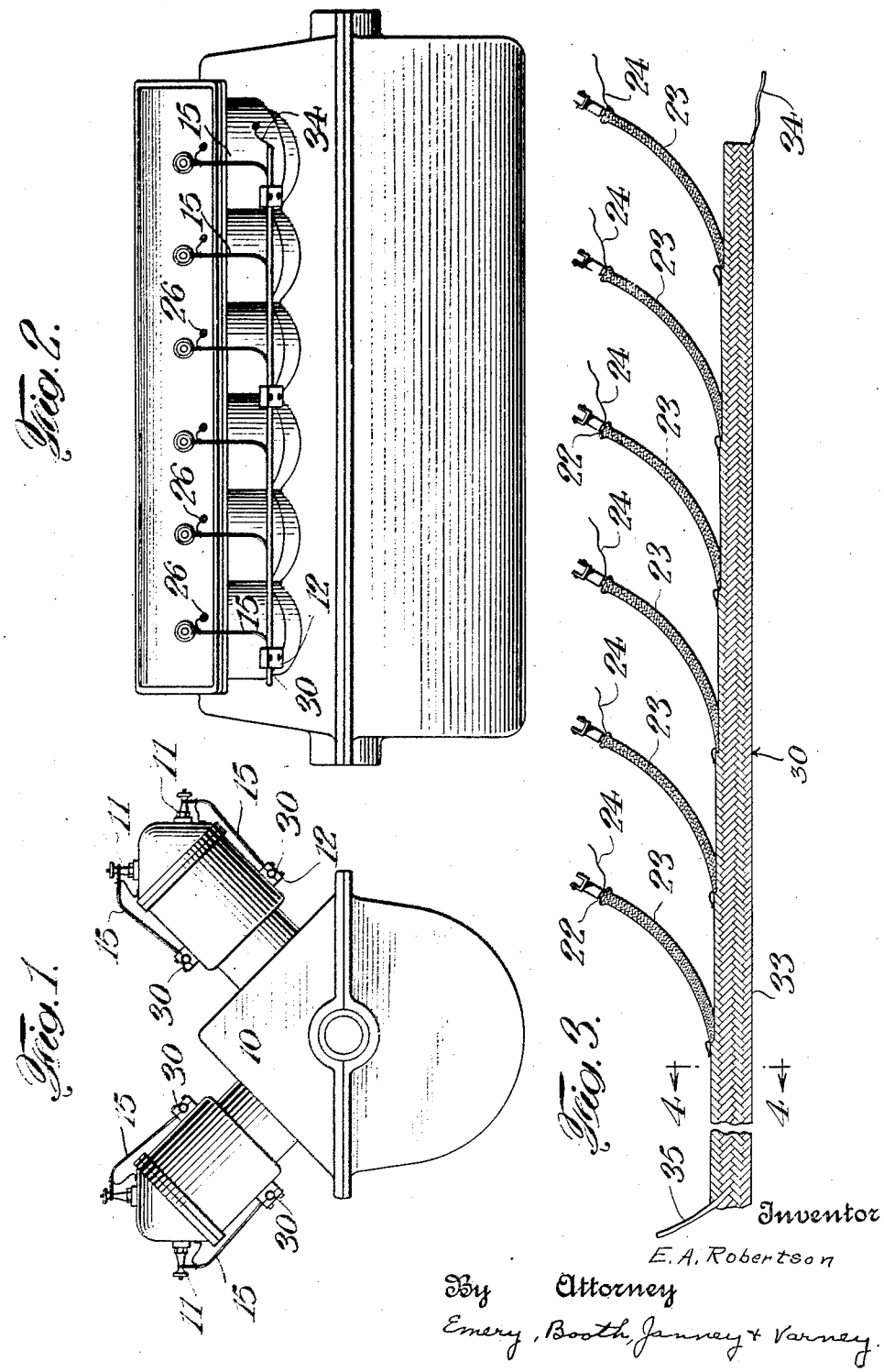
Inventor
E. A. Robertson
By Attorney
Emery, Booth, Janney & Varney.

July 18, 1939. E. A. ROBERTSON 2,166,420
IGNITION MANIFOLD CABLE
Original Filed Dec. 15, 1928 2 Sheets-Sheet 2
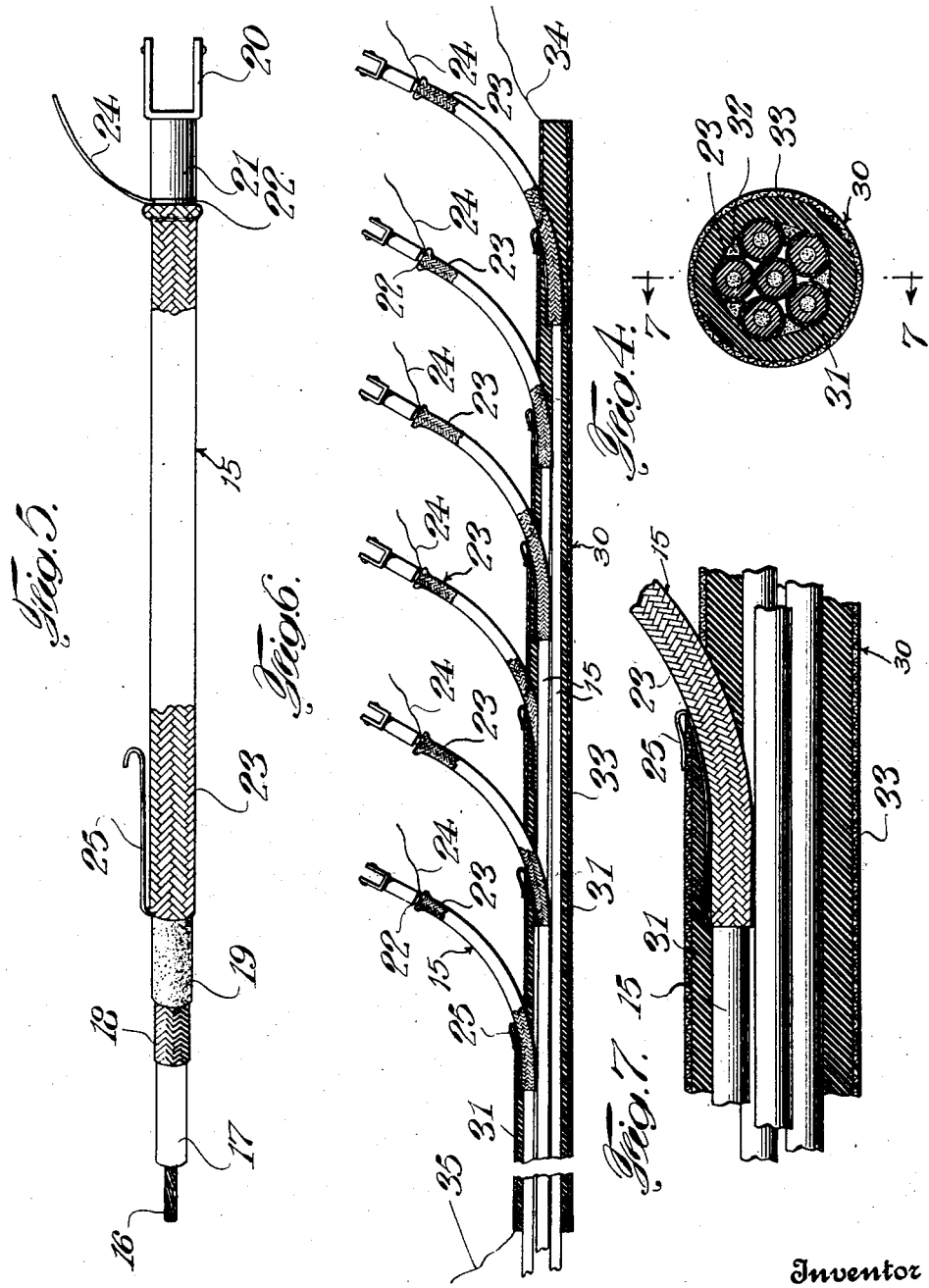
Inventor
E. A. Robertson
By Attorney
Emery, Booth, Janney & Varney Patented July 18, 1939

2,166,420

UNITED STATES PATENT OFFICE 2,166,420

IGNITION MANIFOLD CABLE

Edwin A. Robertson, Detroit, Mich., assignor, by mesne assignments, to Bendix Aviation Corporation, South Bend, Ind., a corporation of Delaware Application December 15, 1928, Serial No. 326,201
Renewed November 26, 1938

24 Claims. (Cl. 174—72)

This invention relates to manifold cables, particularly to manifold cables used in or about automotive devices such as motor boats, aircraft or motor vehicles and has for an object the provision of an improved cable and method of making the cable.

The invention has been developed largely in connection with the problem of providing ignition wiring for the motors of aircraft equipped for radio communication, so in order to simplify the description particular reference will be made to this application of the invention although it will be fully apparent that the invention is useful for numerous other applications.

For mechanical protection and neatness it has for some time been customary to place ignition wires of internal combustion motors in conduits, usually metallic conduits secured to the motor casing and provided with side openings at proper intervals for the issuance of the wires to the spark plugs. More particularly have metallic conduits been used recently since the advent of radio communication by aircraft, it having been found that this metal covering for the wires in some measure at least prevents disturbance by the ignition current with radio communication.

These metallic conduits, however, being an assembly of several rigid or flexible metal tubes do not protect the wires but are a hazard, especially at points where bends in the wires are made; they do not fully enclose the wiring system, especially where the wires branch to the spark plugs; they produce sharp bends in the wires in the case of rigid tubes at the holes from which the wires emerge; they chafe the wires at these hole edges to ground the wires; they often cut the coverings of the wires as they are pulled into the tube, which cut portions are drawn inside to later cause unexpected trouble; they do not prevent the entry of water or oil at openings and aggravate damage from this cause by reason of retaining the water or oil so admitted; they are not flexible throughout so as to permit bending of the assembly in wiring, the space in aeroplanes often being so limited as to necessitate entire removal of the motor to remove the wiring assembly when rigid conduits are used; and they allow the wires to move and shake about therein thus creating a variable capacity factor which may seriously interfere with the ignition at the spark plugs.

Some of the more particular objects of this invention, therefore, are directed to the relief of the enumerated and other difficulties as will be made apparent from the following detailed description of one illustrative embodiment of the invention. An understanding of the description will be assisted by the accompanying drawings, wherein:

Figure 1 is an end elevation of a V-type internal combustion motor showing one embodiment of the invention;

Figure 2 is a side elevation of the same;

Figure 3 is an elevational view of the manifold cable;

Figure 4 is an enlarged cross section taken on the line 4—4 of Figure 3;

Figure 5 is an elevational view of the spark plug end of a single conductor, the covering of the conductor being cut away in steps to show its construction;

Figure 6 is a longitudinal sectional view of the cable; and

Figure 7 is a partial longitudinal section through the cable at the left branch conductor in Figure 3, the view being taken on the line 7—7 of Figure 4.

Referring to the drawings, Figures 1 and 2 show a V-type internal combustion motor 10 having six cylinders in each bank or block and each cylinder having two spark plugs 11, one on either side. The spark plugs are supplied with current by insulated conductors 15 branching from a cable manifold 30 secured at intervals to the motor casing by clamps 12. The several manifolds extend to a timer (not shown) arranged in any usual location on the motor.

In Figures 4 and 6 the several insulated conductors 15 are shown assembled in a rubber sheath 31, fillers 32 of jute, rubber or other suitable material being placed in the valleys between conductors beneath the sheath.

The sheath is preferably formed of a rubber compound resistant to oils and is very tightly moulded upon the conductors to prevent any lateral movement between them, though permitting sufficient longitudinal slip to allow the cable to be readily bent for installing in close places or on radial motors. During such bending the several wires do not spread laterally but by the sheath are securely held in their proper relative positions. The longitudinal slip, however, all occurs within the assembly, the conductors where they branch from the cable being fixedly secured and sealed with the sheath 31 of the cable but being slidable relative to each other at the timer end of the cable. The manifold cable can thus be assembled before the several conductors are cut to exact length at the timer. After the cable has been installed and the conductors have become adjusted in position they may be cut to proper length and connected in such a manner that there will be no part of the unshielded conductors exposed.

Desirably, the rubber sheath is molded on under pressure and a pressure which is active throughout the time the cure is taking place to produce a tough, solid covering, free from internal air bubbles and having a smooth round contour at all points along its length.

The individual conductors 15, as shown in Figure 5, comprise a metallic conductor 16, either solid or stranded, provided with a compact insulating jacket 17 of rubber or other suitable material, covered if desired with a fabric braid 18 which may be given a lacquer coating 19. Finally the conductor thus covered, or at least so much of it as is assembled in the cable, if desirable or necessary to provide longitudinal slip between conductors and between conductors and the enclosing sheath, is given a coating of paraffin wax or other suitable substance to give it a slick finish.

The conductors, however, have a rigid connection with the cable sheath at their point of branching so if necessary to assure such connection the slick coating is left off at these junction points.

At their ends the metallic conductors 16 are soldered to spark plug clips 20 which are provided with insulating sleeves 21 having annular grooves 22.

A manifold cable made up with only the elements thus far described may be used to advantage where the problem of shielding is not present. The assembly is compact and neat; may be clamped to the motor frame to prevent terminal clips from jarring loose; is flexible so as to bend for installation either in close places or on different types of motors without undue strain or distortion of the insulating coverings; permits the conductors where they branch to assume a gentle rather than a sharp curve such as is produced with metallic conduit; does not permit lateral movement between conductors; and provides a tough covering resistant to mechanical injury and one which successfully excludes oil and water.

When the problem of radio shielding is present a complete flexible metallic armor is applied to both the assembly and the individual conductors where they are exposed between the manifold and the spark plugs. This armor is bonded at required points such as the junction points of the individual conductors and is grounded to the motor frame at a plurality of points.

As shown in Figure 6, a metallic braid 23, which may be composed of flat strands of wire, is started in the groove 22 of the insulating sleeve 21 and is carried back on the conductor to extend well into the assembly beneath the rubber sheath when molded on. An end 24 of the wire is left free at the outer end for grounding to the motor casing and another end 25 is left free at the inner end of the braid to be brought out of the rubber sheath (Fig. 7) for bonding with the armor of the cable assembly. The end 24 may be attached beneath any convenient bolt head or even beneath the spark plug itself if a washer is used, but for purposes of illustration is shown secured beneath a screw 26. The end 25 may be soldered or otherwise connected to the assembly armor. If not turned beneath the assembly armor the end 25 where connected will be cut as short as possible to give a neat appearance.

The assembly is provided (Figures 3 and 6) with a similar braided metal armor 33 bonded, as described, to the armor of each conductor and provided at its extremities with grounding ends 34 and 35 secured in any suitable manner to the motor casing. The clamps 12 supporting the cable provide grounding of the metallic armor at intermediate points along the cable.

When the cable is equipped with this braided metal armor the rigid connection between conductors and assembly at the point of branching of the conductors is easily effected since the molded rubber sheath adheres readily to the metal braid of the conductors extended into the rubber sheath.

It will be apparent that the electrical capacity of a shielded assembly of the kind described will be constant, and further, the liability of mechanical abrasion or cutting is eliminated since the conductors are not movable laterally relative to each other or to their casing. Usually a soft tinned copper wire braid is found to be satisfactory but if necessary or desirable a harder wire may be employed.

The present method of making the cable manifold in so far as has not been made apparent above is as follows: When assembling the conductors they may be bound after the valley fillers are applied with cord and then wound with rubber tape. The branch conductors are brought out of the assembly in a single plane unless special conditions require them to be disposed otherwise.

In the specific construction described the metal armor 33 for the assembly is outside the rubber sheath but it may if desired be otherwise disposed, in which case provision will be made for grounding the armor through the rubber sheath along the length of the trunk of the assembly.

While only one embodiment of the invention has been illustrated and described it is to be understood that various changes and modifications may be made within the spirit of the invention as set forth in the appended claims.

I claim as my invention:

1. A flexible manifold cable for internal combustion motors, comprising a plurality of rubber covered conductors of varying lengths, spark plug terminals on one end of each of said conductors, said terminals including an insulating sleeve having an annular groove, a covering comprising a fabric braid, lacquer coating and paraffin coating for each of said conductors, a metal braid starting in the annular groove of said terminal sleeve and extending back a distance from the end of each conductor, loose strand ends extending from both extremities of said braid, one end for grounding and the other end for bonding along the trunk of the cable, a rubber sheath tightly molded upon said several conductors and upon the inner ends of said metal braids to form a rigid connection where the conductors enter the assembly but permitting slidable movement at other points within the assembly, a metal braid on said assembly, said inner braid strand of the conductors being brought out of the sheath and bonded to said assembly braid, loose strand ends on the extremities of the assembly braid for grounding, and supporting clamps for grounding said assembly braid at intermediate points.

2. A flexible manifold cable comprising a plurality of insulated conductors assembled within and branching from a trunk portion of the cable, and a cover molded upon said trunk and forming a seal about the roots of said branches, said several conductors being rigidly attached to said cover at the branch roots but being slidable relative to each other and to the cover at all other points within the cable.

3. A manifold cable comprising a plurality of insulated conductors assembled within and branching from a trunk portion of the cable, and a flexible rubber cover molded tightly upon said trunk and forming a seal about the roots of said branches, said several conductors being slidable relative to each other and to the cover along the length of the cover.

4. A flexible manifold cable comprising a plurality of insulated conductors assembled within and branching from a trunk portion of the cable, and a cover molded upon said trunk and forming a seal about the roots of said branches, said several conductors being rigidly attached to said cover at the branch roots but being slidable relative to each other and to the cover at all other points within the cable, said conductors being provided with a metal armor at their roots held within said cover.

5. A flexible manfold cable comprising a plurality of insulated conductors assembled within and branching from a trunk portion of the cable and a cover molded upon said trunk and forming a seal about the roots of said branches, said several conductors being rigidly attached to said cover at the branch roots but being slidable relative to each other and to the cover at all other points within the cable, said conductors within the trunk beyond the branch roots being provided with a slick coating to provide slip.

6. A flexible manifold cable comprising a plurality of insulated conductors assembled within and branching from a trunk portion of the cable and a cover molded upon said trunk and forming a seal about the roots of said branches, said several conductors being rigidly attached to said cover at the branch roots but being slidable relative to each other and to the cover at all other points within the cable, said conductors within the trunk beyond the branch roots being provided with a paraffin coating to provide slip.

7. A manifold cable comprising a trunk including a plurality of separately covered conductors and a molded covering binding the assembled conductors tightly together, a braided metal armor extending from the outer end of a branch conductor into said trunk covering, a metal braid enclosing the assembled conductors along said trunk, and an electrical connecton between said conductor braid and said trunk braid.

8. A manifold cable comprising a trunk and branches, a flexible metal armor on said trunk provided with a loose metal strand at each end thereof, a flexible metal armor on a portion of each of said branches provided with a loose metal strand at its outer end, and an electrical connection between the trunk and branch armors at their junctions.

9. A manifold cable comprising a trunk and branches, an insulating covering and a braided metal armor on each branch, a molded insulating covering and braided metal armor on said trunk, and a soldered connection between the metal armor of each branch and the trunk.

10. A manifold cable comprising a trunk and branches, terminal sleeves on the ends of said branches provided with annular grooves and a metal braid on each of said branches starting as braided within said groove and extending to said trunk.

11. The method of manufacturing manifold cables which comprises braiding a metal armor on one end of each of a plurality of insulated conductors of varying lengths, assembling the conductors with the ends projecting from the side of the assembly, applying a rubber covering upon the trunk and about the junctions of said conductors, and molding said rubber covering under high pressure.

12. A manifold cable comprising a plurality of conductors assembled within and branching from a trunk portion of the cable, and a molded cover for said trunk closely embracing said conductors and sealing the space about them at their points of emergence but permitting their longitudinal slippage within the trunk.

13. A manifold cable comprising a plurality of insulated conductors assembled within and emerging from a trunk portion of the cable, and a molded cover for said trunk closely embracing said conductors and sealing the space about them at their points of emergence, said conductors being attached at one point along the assembly trunk portion but being free to slide in the trunk elsewhere.

14. A flexible manifold cable comprising in combination, branch conductors provided with a flexible insulating covering thereon, a trunk assembly including conductors provided with a flexible insulating covering tightly molded thereon, the covering being very dense and free from voids, flexible metal coverings tightly placed on the branch conductors beyond the trunk, a flexible metal covering tightly placed on the trunk, and electrical connections between the metal coverings on the trunk and branches.

15. A flexible manifold cable comprising a trunk including a plurality of separately covered conductors branching from said trunk, and a flexible molded covering binding the assembled conductors tightly together, a braided metal armor extending from the outer end of a branch conductor into said trunk covering, a metal braid inclosing the assembled conductors along said trunk, and an electrical connection between said conductor braid and said trunk braid.

16. A manifold cable comprising a trunk and branches, an insulating covering and a braided metal armor on each branch, a molded insulating covering binding the assembled branches together, a braided metal armor on said trunk, said branch armor and said trunk armor being electrically connected and completely enclosing said branch and trunk respectively at their point of junction.

17. In combination, a group of high tension ignition conductors, a tube of insulating material enclosing at one of its ends, all of said conductors, some of said conductors extending outwardly through said tube at intervals spaced along the length thereof, flexible metallic sheathing covering said tube, flexible metallic sheathing on the exposed portions of said conductors, said conductor sheathing extending through said tube sheathing and the tube to the interior of the latter and having end portions returned from said tube interior to its exterior and there electrically connected and anchored to said tube sheathing.

18. A manifold cable comprising a trunk and branches, an insulating covering and a braided metal armor on each branch, a molded insulating covering and braided metal armor on said trunk, and an electrical connection between the metal armor of each branch and the trunk.

19. A flexible shielded unitary ignition cable comprising a plurality of insulated conductors of different lengths, a flexible molded insulation compound surrounding said conductors, and shielding means comprising a jacket of flexible conducting material covering said insulation compound and extending around said conductors, each of said conductors forming separate branch leads having an individual shielding jacket surrounding the insulation of each of said branch leads, said branch shielding jackets being in metallic contact with said first mentioned jacket to form a continuous shield adapted to substantially resist the passage of electromagnetic stresses from said cable and branch leads.

20. A flexible manifold cable comprising a plurality of insulated conductors assembled within and branching from a trunk portion of the cable, and a flexible resilient cover molded tightly upon said trunk and forming a seal about the roots of said branches, a complete flexible metal armor upon said trunk and branches, said several conductors being slidable relative to each other and to the cover along the length thereof and maintaining a constant positional relationship to each other and to the cover whereby to provide substantial constant electrical capacity.

21. A radio shielded ignition manifold assembly comprising in combination, a trunk having conductor branches emerging therefrom at spaced intervals, said branches having electrical insulation and radio shielding armor thereon, said trunk including an insulatin sheath and radio shielding armor enclosing the assembled conductors and providing spaced lateral openings therefor at points of emergence, and a fluid tight seal and electrical armor connections between said trunk and branches at the points of emergence, and said trunk covering elsewhere excluding fluid from the assembly of conductors therein.

22. A flexible radio shielded ignition manifold cable for internal combustion motors, comprising a plurality of flexible rubber covered conductors branching at intervals from a trunk assembly, flexible metallic shielding braid on said conductors extending from near their outer ends back into the trunk assembly, a flexible rubber cover tightly molded on said trunk assembly so as to bind said conductors securely against relative lateral movement, said trunk cover providing a tight seal about said branch conductors at the points of emergence from said trunk, a flexible metallic shielding braid on said trunk, and electrical connections between said trunk braid and said branch conductor braids, said connections being spaced away from the branch conductors to permit flexing of the branch conductors at the points of emergence from said trunk.

23. A shielding means for engines having a distributor and spark plugs comprising a main element adapted to be secured to an engine between the distributor and the spark plugs and to enclose at least portions of a plurality of ignition wires thereof, solid insulating material substantially filling said element around said wires, and a plurality of elements each connected with the main element and adapted to receive and shield individual wires, said elements forming a continuous electrical shield for the wires.

24. A shielding means for engines having a distributor and spark plugs comprising a main element adapted to be secured to an engine between the distributor and the spark plugs and to enclose at least portions of a plurality of insulated ignition conductors thereof, a moulded insulating compound binding said conductors together in said element, and a plurality of elements each connecting with the main element and adapted to receive and shield individual conductors, said elements forming a continuous electrical shield for the conductors.

EDWIN A. ROBERTSON.